Oct. 30, 1973  D. R. HINRICHS  3,769,379

APPARATUS FOR AND METHOD OF MAKING PLASTIC FILM

Filed March 22, 1971

INVENTOR.
DONALD R. HINRICHS

BY Glenn, Palmer, Lyne,
Gibbs & Thompson

HIS ATTORNEYS

United States Patent Office 3,769,379
Patented Oct. 30, 1973

3,769,379
APPARATUS FOR THE METHOD OF MAKING PLASTIC FILM
Donald R. Hinrichs, Waynesboro, Va., assignor to Reynolds Metals Company, Richmond, Va.
Filed Mar. 22, 1971, Ser. No. 126,531
Int. Cl. B29d 23/04; B29f 3/08
U.S. Cl. 264—40
6 Claims

ABSTRACT OF THE DISCLOSURE

Plastic film is made using a heat transfer liquid circulated through the film extrusion die to control (by either heating or cooling, as required) the temperature of the plastic melt flowing through such die. A plastic bubble emerging at the outlet of the die is inflated and ventilated by continuously circulated gas which is controlled in temperature as it enters and leaves the bubble so that it does not adversely affect the temperature of the melt in the die.

BACKGROUND OF THE INVENTION

Plastic film has long been made by inflating a tubular section being extruded from an annular orifice in a die to define a tubular film bubble and then collapsing the tube between a pair of cooperating rollers to define a double thickness film which is rolled on a take-up roll. Control of the temperature of a plastic melt flowing through an extrusion die has been a problem. Degradation of the melt within the die or build-up of solidified melt along the inner lip of the die outlet can have adverse effects on film quality and shorten the operating cycle of the die before the die must be shut down for recleaning of the die passages. Temperature control is important for achieving uniform gauge across the width of the film strip after slitting of the extruded tube. Any lack of uniform gauge is magnified when the film is subsequently stretched, as it frequently is for purposes of making oriented heat-shrinkable film.

SUMMARY

This invention provides an improved apparatus and method for extruding plastic film in a more economical manner, due to longer operating cycles between shut-downs, and with improved uniformity of gauge transversely of the direction of extrusion. This apparatus and method employs a temperature and flow controlled heat transfer liquid which is circulated through the extrusion die to control (by either heating or cooling, as required) the temperature of the plastic melt flowing through the die. Air or other gas used to inflate and ventilate the plastic bubble emerging from the die outlet is also controlled in temperature when it passes through the die so as to not adversely affect the temperature of the melt in the die.

Other details, uses, and advantages of this invention will become apparent as the following description of the embodiment thereof presented in the accompanying drawing proceeds.

BRIEF DESCRIPTION OF THE DRAWINGS

The accompanying drawing shows a present preferred embodiment of this invention, in which.

DESCRIPTION OF ILLUSTRATED EMBODIMENT

Figure 1:
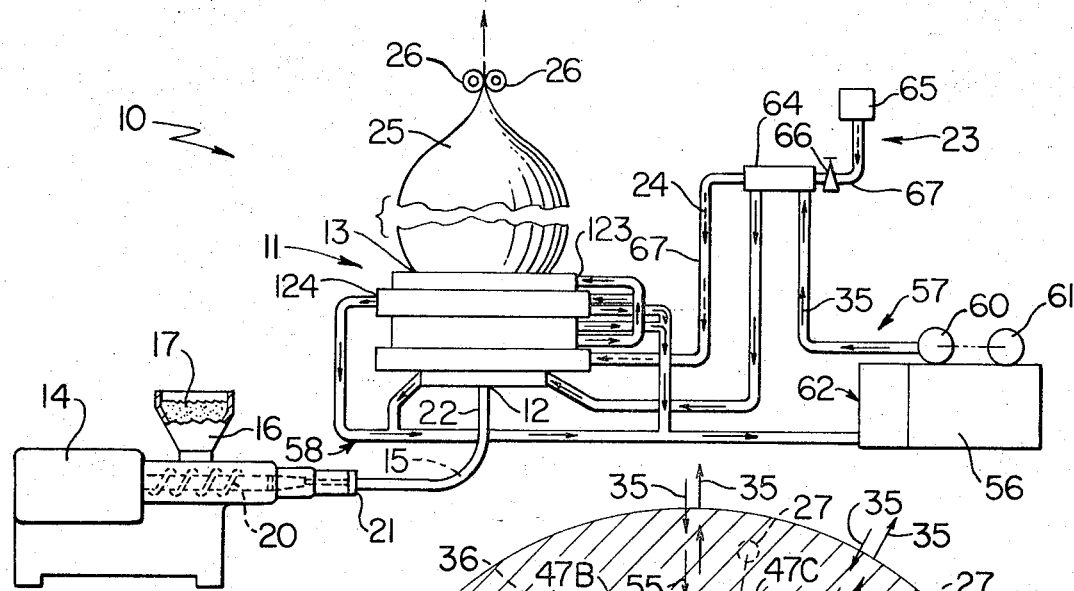
FIG. 1 is a schematic side elevation, partly sectioned and partly broken away, of a film extrusion die and associated temperature control apparatus, including the emerging tubular film bubble and pinch rolls.

The apparatus shown in FIG. 1 of the drawing is designated generally by the reference numeral 10 and is adapted for extruding polyvinyl chloride, nylon, or other polymeric or like plastic material to produce a thin plastic film.

The apparatus 10 comprises an extrusion die 11 having an inlet 12 and an annular outlet 13 and an extruder 14 supplies a hot plastic melt 15 under pressure to the inlet 12. A supply bin 16 feeds the extruder 14 with a suitable plastic material 17 in flowable particulate form; and, the extruder 14 has heating means for melting the plastic material 17 and a helical screw 20 for forcing the molten material or melt 15 through an outlet 21 and through a supply conduit 22 to the die inlet 12. The plastic melt 15 is supplied to the inlet 12 at a controlled and substantially constant temperature suitable for the physical and chemical properties of the plastic material 17.

The apparatus 10 has means indicated generally at 23 for supplying air or other suitable gas (designated by dotted arrows 24) through the die 11 to inflate a tube produced by extrusion of the plastic melt 15 through the annular die outlet 13, and such tube is pinched by rollers 26 to trap a moving film bubble 25 between the die outlet and the rollers. The double thickness of film passing from the rollers 26 may be wound on a supply roll or further processed in any suitable manner known in the art. Often the tube is slit and the film is stretched to increase its area and then chilled to retain it in stretched condition. It is then in condition for subsequent heat shrinking for packaging purposes.

The air 24 is suitably provided to the lower portion of the die 11 and is conveyed axially therethrough using passages 27. The air is then conveyed by radially inwardly directed passages to a central cylindrical passage 30 which extends substantially axially through the upper end portion of the die 11 into the film bubble 25. The air 24 is supplied at a controlled temperature and pressure to cause expansion of the film bubble 25 in a precisely controlled manner.

The air 24 flows into the center of bubble 25 through passage 30 and initially flows upwardly into such bubble as indicated by the arrows at 31. It then flows downwardly along the sides of the bubble (as indicated by the arrows 32) into a plurality of passages 33 through the die which extend in spaced parallel relation to each other and are arranged concentrically around the central passage 30. The passages 33 communicate with an annular chamber 34 and passages 36 are provided in die 11 in flow communication with chamber 34 for conveying the air in such chamber out of the die.

Volatile substances from the plastic melt pass into the air in the bubble and tend to build up in concentration as more film passes around the bubble. Moreover, cold air is blown (by conventional means, not shown) against the outside of the emerging extruded film to chill and solidify it. These effects can lead to condensation of the volatile substances and consequent damage to the film upon being contacted by the condensate. Continuous withdrawal of air in the bubble 25 prevents such build up of concentration of volatiles and, thus, protects the film from the damaging effects of excessive concentration of volatiles.

The apparatus and method of this invention uses a heat transfer fluid in the form of a liquid designated by solid arrows 35. The liquid 35 provides efficient temperature control of the melt 15 in the die by either heating or cooling the melt, as required in different parts of the die. In addition, the liquid 35 is also used (as will be described subsequently), to control the temperature of the air 24 entering and leaving the bubble 25 to further assure precise control of the temperature and, hence, even flow of the melt through the die 11. The liquid 35 is supplied to the die from a manifold 123 which encircles the die.

While the liquid 35 might for heating purposes be replaced by fluids in other phases, such as gases or gaseous vapors (e.g., steam), a liquid is far superior because it can function efficiently both for heating and cooling, which is part of the intended operation of the apparatus and method of the invention. Steam and like vapors may be suitable for heating but are unsuitable for cooling in dies of the kind in question. Gases like air are inefficient for both heating and cooling in dies of the kind in question, because of poor heat absorption and heat transfer capacity.

During operation of the apparatus 10, the melt 15 enters inlet 12 and travels vertically upwardly through a cylindrical passage 44 in a lower portion 11A of die 11. The melt 15 flares outwardly from the top of passage 44 into an annular conically extending passage 45 in the die lower portion 11A. A plurality of spaced parallel channels 47 extend through a central portion 11C of die 11 and at their lower ends communicate with the peripheral edge of the annular passage 45 and convey the melt therefrom in a plurality of separated plastic strands 48 through the central die portion 11C. The strands 48 are recombined in the upper portion 11B of the die where the upper ends of channels 47 communicate with the lower end of an annular cylindrical passage 50 through the upper die portion 11B. The upper end of passage 50 terminates in the annular die outlet orifice 13.

Die 11 has integral heat transfer means comprising a plurality of cooperating passages in the die body. The lower portion 11A of the die 11 has passages 51 to provide circulation of liquid 35 closely adjacent the melt passing into and through conical passage 45. A plurality of interconnected passages 52 provide flow of liquid 35 through parts of the central die portion 11C and circumferentially around portion 11C where it extends around the outside of the strand channels 47. Other interconnected passages 53 provide circulation of liquid 35 through the upper die portion 11B where it extends around the outside of the annular passage 50. In addition, interconnected passages 54 provide flow of liquid 35 through the central and upper die portions 11C and 11B and have portions which pass closely adjacent to the strand channels 47 and annular passage 50. The passages 54 also extend closely adjacent to return air-conveying passages 33. The interconnected passages 54 of this example are placed in flow communication with the passages 52 through the use of radial passages 55. The passages 55 extend radially through the central die portion 11C and provide flow of liquid between pairs of strand channels 47 and both to and from passages 54. The liquid 35 is collected from the die in manifold 124 which encircles the die.

Figure 2:
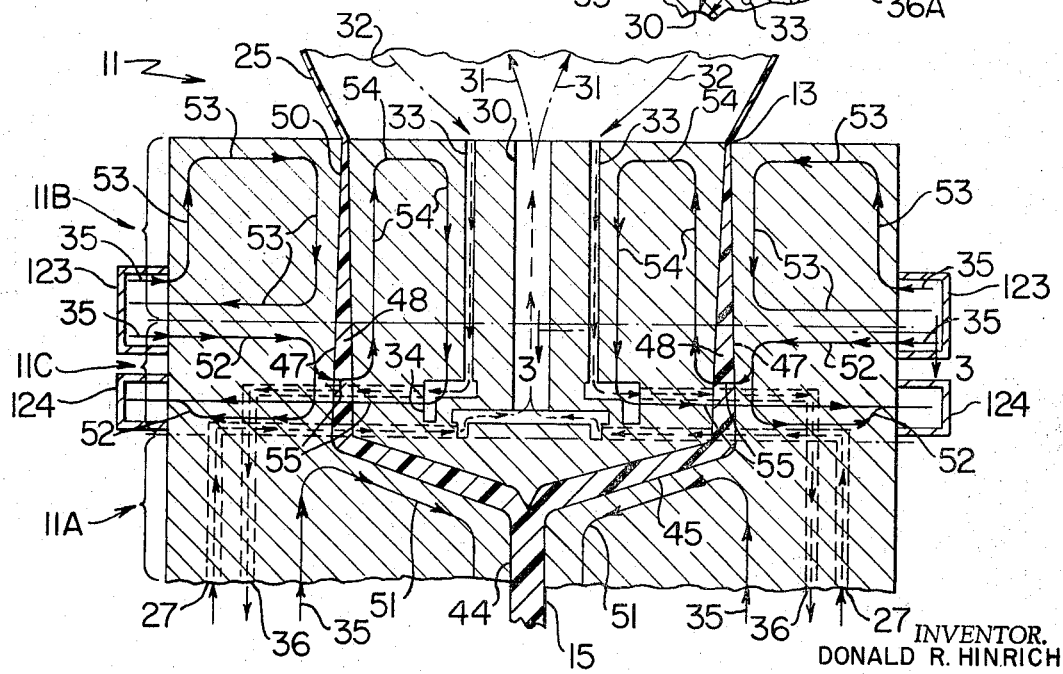
FIG. 2 is a schematic and partially broken away fragmentary cross-section view taken on the axis of the film extrusion die shown in FIG. 1.

The liquid-conveying passages 51–55 have been shown schematically in FIG. 2; and, it will be appreciated that this has been done for simplicity of presentation. Further, in some applications it may be desired to provide liquid to the passages 54 independently of the passages 52.

Figure 3:
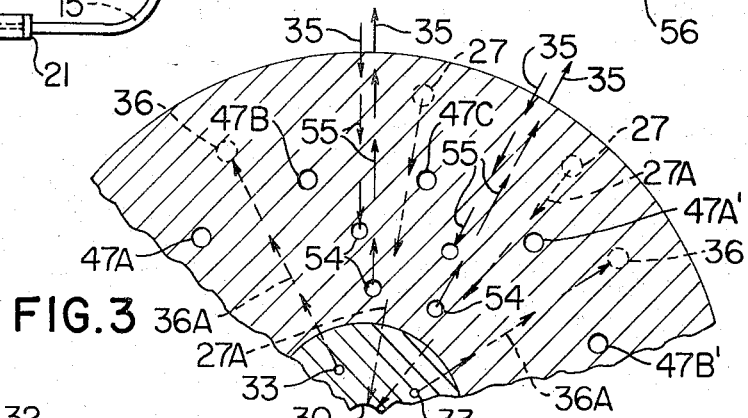
FIG. 3 is a schematic cross-sectional view taken approximately on the line 3—3 of FIG. 2 to show the flow passages of the liquid and gas between the channels carrying the plastic melt.

FIG. 3 shows a schematic arrangement of air and liquid passages in the die as air and liquid pass continuously between the strand channels 47. In the present preferred embodiment of the invention, a series of strand channels designated 47A, 47B, 47C and 47A' have different flow passages for air and liquid between them, and the flow passage pattern is repeated for each succeeding set of four channels (channel 47A' being the first channel of the next series of four) and so on around the die. Between channels 47A and 47B there is a radially extending air outflow passage (indicated by flow arrows designated 36A) connecting passages 33 and 36. About midway between channel 47B and 47C there are radially extending liquid outflow and inflow passages (indicated by flow arrows 55). The liquid outflow and inflow passages are displaced vertically to avoid interference with each other. Incoming preheated air 27A is fed between channels 47B and 47C (shown close to channel 47C for convenience in the figure, but actually midway between channels 47B and 47C and displaced vertically to avoid interference with the liquid passages 55). The arrangement of air and liquid passages between channels 47B and 47C is repeated between channels 47C and 47A'. The pattern is repeated for the next series of four channels as explained above, wherein 47A' is the first channel of the next series.

The liquid 35 thus passing back and forth between strand channels 47 controls the temperature of the metal between strand channels 47 to thereby control the temperature and flow of the melt 15. The liquid 35 also flowing through those portions of passages 54 arranged adjacent air passages 33 supplements the reheating of cooled returning bubble air in passages 33 for purposes of suppressing undue local cooling effect on the melt of the returning air as it passes between strand channels 47.

The incoming air 24 provided to the die 11 is preheated to a temperature close to the temperature of the melt and the liquid 35 flowing through the various interconnected liquid-conveying passages 51–55 assures that the preheated air temperature is equalized with that of the melt as they both flow through die 11. In addition, these liquid-conveying passages are supplied with liquid 35 as the same predetermined temperature, preferably by being connected to a common preheated reservoir and this tends to equalize temperatures throughout the die.

In extruding melt through an associated die the temperature of the melt adjacent the die outlet is greater than the temperature of such melt at the die inlet. To prevent the melt outlet temperature from becoming excessive, which would cause rapid degradation and possible charring of the melt resulting in blockage of the melt passages, the temperature of the liquid 35 flowing through passages 53 and 54 in the upper die portion 11B, for example, is relatively cooler than the temperature of the melt as it flows through die portion 11B whereby such liquid serves to locally cool the melt.

The heat transfer liquid 35 is of the type which has a relatively high thermal conductivity and high boiling point. One liquid which has been successfully used is sold under the trade name of Therminal FR–1 and is manufactured by the Monsanto Company, St. Louis, Mo.

The exemplary apparatus 10 has its supply of heat transfer liquid 35 contained in a reservoir 56, see FIG. 1, and a system is provided for supplying the liquid 35 to the die 11 and returning such liquid to the reservoir 56 and such system comprises a supply conduit system 57, a return conduit system 58, and suitable pressure means in the form of a pump 60 driven by a motor 61 for flowing or circulating the liquid 35 through the conduit systems 57 and 58 and, hence, die 11. The apparatus 10 also has a heat transfer assembly 62 which is provided with heat exchangers and suitable controls for controlling the temperature and flow of liquid 35.

The air 24 supplied to the die 11 for inflating the bubble 25 is preheated in a heat exchanger 64 which is supplied with liquid 35 at a controlled temperature from the assembly 62. The heat exchanger 64 is in the form of an oil-to-air heat exchanger and is supplied with air from a compressor 65. However, the air 24 may be preheated using any suitable technique or may be partially heated prior to being introduced into the heat exchanger 64. An adjustable air pressure regulator 66 is also provided in a supply conduit 67 which provides the air 24 to the inlet passages 27 of the die and the regulator 66 may be adjusted to assure proper inflation of the bubble 25.

In this example, liquid 35 at a predetermined temperature and from reservoir 56 is supplied to all parts of the die 11. The die 11 may be supplied with suitable external conduits so that the flow of liquid through its portions 11A, 11B, and 11C may be in series, parallel, or in series through certain die portions and in parallel through the other portons and vice versa. In addition, the use of parallel flow paths through the die makes it possible to supply liquid at different temperatures and, if desired, from separate reservoirs through each flow path whereby in one portion of the die the liquid 35 provides heating while in another portion of the die such liquid provides cooling. However, regardless of whether a liquid 35 is supplied to each die portion from a single reservoir or a plurality of reservoirs, by having parallel flow paths through the die the rate of liquid flow through each parallel path may be controlled by the configurations and sizes of the flow passages and the use of suitable valves and restrictors whereby the desired amount of heating or cooling provided by the liquid 35 in the associated die portion may be precisely controlled.

In a typical application using the apparatus and method of this invention to make polyvinyl chloride film, the die 11 had an outlet orifice diameter of about 10 inches and the die had dozens of strand channels 47. Melt was provided from extruder 14 so that it entered the inlet 12 of die 11 at a flow rate of approximately 400 lbs. per hour, at a temperature of approximately 420° F., and a pressure of approximately 3500 p.s.i. The melt extruding from the outlet orifice 13 was at a temperature of approximately 435° F.

It has been found by tests that the melt temperature rises in the die due to dissipation of the pressure at the rate of about 6.5° F. per 1000 p.s.i. Although some of the heat is lost to the cooler die surfaces, it will be readily apparent that there is generally a need to provide for local cooling of the melt particularly in local hot spots near the diet outlet.

The heat transfer liquid 35 in this application entered the die at a temperature of approximately 420° F. and a pressure of approximately 20 p.s.i. and exited the die at approximately 420° F. and 15 p.s.i.

The air 24 to the die was controlled so that it was heated by the heat exchanger 64 and entered the die 11 at a temperature of approximately 390° F. and a flow raet of about 10 c.f.m. The air 24 exited the die at essentially the same temperature and flow rate. The air entered the bubble 25 at a temperature of approximately 380° F. and 10 c.f.m. and exited the bubble at an estimated temperature of 200° F. and 10 c.f.m. whereupon it was reheated in the die so that it exited the die at the previously mentioned temperature of about 390° F. and flow rate of 10 c.f.m. so as not to adversely affect the temperature of the melt.

For convenience and ease of presentation, the die 11 has been presented in the cross-sectional view of FIG. 2 as a single piece; however, it will be appreciated that such die may be made of any convenient number of component parts.

While present exemplary embodiments of this invention, and methods of practicing the same, have been illustrated and described, it will be recognized that this invention may otherwise variously embodied and practiced within the scope of the following claims.

What is claimed is:

1. A process for extruding plastic film through a die comprising the steps of, feeding a plastic melt under pressure to a die inlet, dividing the melt into a plurality of spaced strands and thereafter recombining it to form an annulus of plastic melt, extruding the melt annulus through a die orifice and solidifying the melt into a plastic tube, closing said tube at a position spaced from said die orifice, supplying a heated gas to said die at a controlled temperature and pressure from a source thereof and continuously feeding said gas substantially radially inwardly through said die between the spaced melt strands and thence inside the melt annulus to enter and contact the tube, said heated gas supplied to said die and being continuously fed substantially radially inwardly between said spaced melt strands being at a temperature close to the temperature of the melt to assure even flow of said melt strands, and continuously withdrawing said previously supplied heated gas from within the tube and thence inside the melt annulus and substantially radially outwardly through said die between at least several pairs of said plurality of melt strands, said step of continuously withdrawing said gas tending to prevent a build up of volatile substances on the inside of said tube.

2. The process of claim 1 comprising the steps of, heating and continuously feeding a heat transfer fluid through the die adjacent the inside and outside of the annulus of melt passing to the die orifice, the portion of the fluid adjacent the inside of the melt annulus being disposed between said annulus and that portion of the gas returning inside the annulus from the plastic tube.

3. A process according to claim 2 in which the heat transfer fluid is a liquid which remains substantially entirely in the liquid phase as it passes through the die, the plastic melt and heat transfer fluid are supplied to the die at substantially equal predetermined temperatures, and the plastic melt increases in temperature as it passes through the die.

4. A method of makin plastic film comprising the steps of feeding a plastic melt under pressure to a die inlet, dividing the melt into a plurality of spaced strands and thereafter recombining it to form an annulus of plastic melt, extruding the melt annulus through a die orifice and solidifying the melt into a plastic tube, closing said tube at a position spaced from said die orifice, supplying a heated gas to said die at a controlled temperature and pressure from a source thereof and continuously feeding said gas substantially radially inwardly through said die between the spaced melt strands and thence inside the melt annulus to enter the tube causing inflation thereof, continuously withdrawing said previously supplied gas from within the tube and thence inside the melt annulus and substantially radially outwardly through said die between at least several pairs of said plurality of spaced melt strands, and heating and continuously feeding a heat transfer fluid through the die and circulating part of the fluid adjacent the outside of the melt annulus and part of the fluid adjacent the inside of the melt annulus with that part of the fluid circulating adjacent the inside of the melt annulus passing through passages which extend substantially radially through said die between several adjacent pairs of said plurality of melt strands to reach and return from adjacent the inside of the melt annulus, said part of the fluid adjacent the inside of the melt annulus being disposed between said annulus and said withdrawn gas returning inside the annulus from the plastic tube to help reheat said withdrawn gas and suppress any undue local cooling of said melt strands, said fluid passing through said substantially radially extending passages serving to control the temperature of said die between said strands to thereby control the temperature and flow of the melt defining said strands.

5. A method as set forth in claim 4 in which the heat transfer fluid is a liquid which remains substantially entirely in the liquid phase as it passes through the die, the plastic melt and heat transfer liquid are supplied to the die at substantially equal predetermined temperatures, the plastic melt increases in temperature as it passes through the die, and the heat transfer liquid provides heating of said melt in certain portions of said die and cooling of said melt in other portion of said die to precisely control the temperature of the melt flowing through said die.

6. A method as set forth in claim 5 in which said step of supplying a heated gas comprises heating said gas using said heat transfer liquid.

References Cited

UNITED STATES PATENTS

| | | | |
|---|---|---|---|
| 3,385,917 | 5/1968 | Breukink et al. | 264—348 |
| 1,780,948 | 11/1930 | Sherman | 264—209 |
| 3,321,805 | 5/1967 | Given | 425—461 |
| 2,937,402 | 5/1960 | Pierce | 425—461 |
| 3,123,699 | 3/1964 | Stephenson et al. | 219—10.49 |
| 2,529,897 | 11/1950 | Bailey et al. | 264—327 |
| 3,244,781 | 4/1966 | Covington, Jr. et al. | 264—95 |
| 3,577,488 | 5/1971 | Bigland | 264—95 |

ROBERT F. WHITE, Primary Examiner

J. R. THURLOW, Assistant Examiner

U.S. Cl. X.R.

264—95, 169, 209, 210 R, 327